United States Patent [19]
Mukherjee-Roy et al.

[11] Patent Number: 5,535,005
[45] Date of Patent: Jul. 9, 1996

[54] METHOD AND SYSTEM FOR INSPECTING POLISHED SURFACE TEXTURE

[75] Inventors: Moitreyee Mukherjee-Roy, Plano; Charles R. Pettersson, Sherman City; Thomas G. Debner, Howe, all of Tex.

[73] Assignee: Texas Instruments Incorporated, Dallas, Tex.

[21] Appl. No.: 295,979

[22] Filed: Aug. 25, 1994

[51] Int. Cl.$^6$ .................................................. G01B 11/30
[52] U.S. Cl. ........................................................ 356/371
[58] Field of Search .................................. 356/371, 237

[56] References Cited

U.S. PATENT DOCUMENTS

| | | | |
|---|---|---|---|
| 4,376,583 | 3/1983 | Alford et al. | 356/237 |
| 5,293,216 | 3/1994 | Moslehi | 356/371 |

*Primary Examiner*—Richard A. Rosenberger
*Attorney, Agent, or Firm*—W. Daniel Swayze, Jr.; W. James Brady, III; Richard L. Donaldson

[57] ABSTRACT

A method for obtaining texture measurements of a highly-polished surface (110) uses a directed-energy light source (124) to perform the steps of scattering the directed-energy light from a plurality of known texture surfaces. The known texture surfaces have equivalent surface area and dimensions to those of the highly-polished surface (110). A next step is to measure (102 and 130) the scattered light from the directed-energy light source (124) to establish a threshold energy level measurement (48, 50, or 52) above which the measured scattered light varies according to differences in texture among the plurality of known texture surfaces. From variations in the measured scattered light a texture-light relationship (Equation 1) is established that expresses expected changes in measured scattered light according to changes in texture in the plurality of known texture surfaces. Scattered light from the highly-polished surface (110) is then measured. A texture measurement is then generated by applying the texture-light relationship (Equation 1) to the measured scattered light from the highly-polished surface (110).

20 Claims, 3 Drawing Sheets

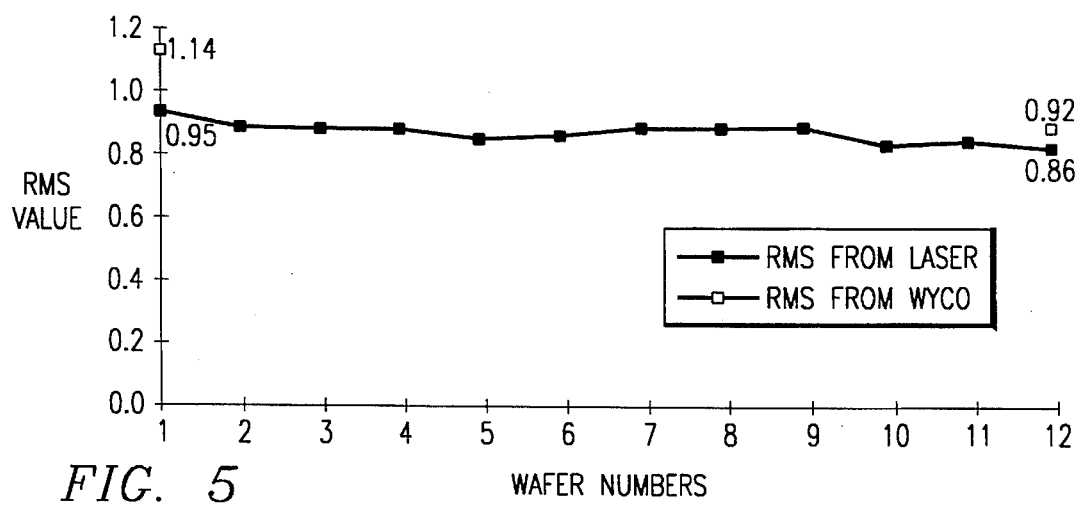
FIG. 5
FIG. 6
| SCRIBE | flow-7 | RMS | RMS pred |
|---|---|---|---|
| 201 | 130 | 0.81 | 0.90 |
| 097 | 152 | 0.92 | 0.90 |
| 324 | 67 | 0.93 | 0.88 |
| 222 | 984 | 1.17 | 1.14 |
| 110 | 1296 | 1.26 | 1.23 |
| 100 | 1919 | 1.27 | 1.41 |
| 251 | 2042 | 1.54 | 1.44 |
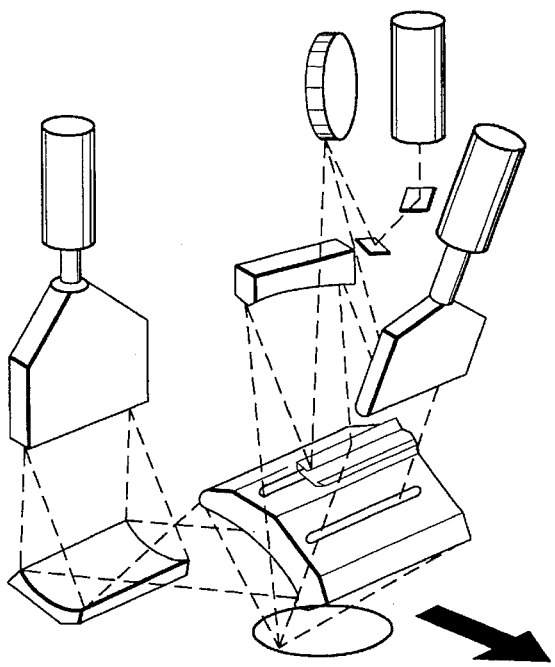
FIG. 7

METHOD AND SYSTEM FOR INSPECTING POLISHED SURFACE TEXTURE

TECHNICAL FIELD OF THE INVENTION

The present invention relates to a method and system for testing and inspecting material properties of electronic devices and, more particularly, to a method and system for inspecting the texture of the entire surface of a polished surface of an electronic device, such as a semiconductor wafer, more rapidly and accurately than do known methods and systems.

BACKGROUND OF THE INVENTION

As wafer sizes increase and geometries shrink, specifications for electronic devices become more stringent. The reason for these more stringent specifications is to obtain better yields and fewer losses after many value added steps have been completed in fabricating the electronic devices. One such important specification for the future is surface texture.

Although surface texture has received little attention in the microelectronics industry until recently, texture or micro-roughness can influence gate oxide integrity, as well as the perfection of wafer bonding. In some cases, surface texture has been known to influence the effectiveness of wafer cleaning. Surface texture is usually reported as root-mean-square (RMS) roughness in a direction that is perpendicular to the surface of the wafer. At present, there is no precise measurement technique to determine surface texture on regular production wafers in a manufacturing environment.

Currently several lab techniques attempt to measure the texture on wafers. Some of these techniques are known by the names of light scattering topography (LST), stylus profilometry, phase shift interferometry, and atomic force microscopy. These methods, as well as all other current methods, are point location measurement methods and do not scan the entire wafer surface. Moreover, the known methods are time consuming and can only measure minute parts of the wafers. For example, a measuring tool known as the WYCO samples one square millimeter of the wafer surface in approximately two minutes. Hence, it takes many hours to sample a sufficient amount of surface area to yield a meaningful surface texture measurement for a single wafer.

With increasing wafer diameter, the surface area increases as a square function. For example, a 200 mm wafer has a surface area of 31,428 sq mm. Known procedures use the millimeter sampling approach to sample usually nine arbitrarily selected one millimeter square spaces. On a wafer whose surface area is 31,428 square millimeters, however, a sample measurement of nine separate one millimeter square areas is quite meaningless.

Consequently, there is no existing method to perform meaningful measurements or inspections of surface microroughness or surface texture.

Still a further limitation that exists in conventional devices relate to the mechanical aspects of measuring highly magnified images. Because the known approaches measure such small areas on the surface, mechanical vibrations severely distort the measurement accuracies.

A third problem of known methods and systems are the effects that any contamination on the surface have on the sample measurement results. Measurements of the highly magnified images that known methods use may include fine particle contamination. In these measurements, the contamination can greatly distort the accuracy of the measurements that these approaches yield.

Yet another problem of conventional surface texture measurement techniques is that they are often destructive to the measured wafer. In conventional methods, samples will be either contaminated or the surface may be damaged in the measurement process. The wafers that are sampled in conventional techniques generally must be removed from the production processes.

SUMMARY OF THE INVENTION

Therefore, a need has arisen for an improved method and system for testing and inspecting the polished surface of an electronic device such as a semiconductor wafer.

There is a need for an improved method and system for inspecting the texture of a polished surface such as a semiconductor wafer that inspects the entire polished surface much more rapidly and accurately than do known methods and systems.

There is the further need for a method and system that provides reliable measurements of texture for a highly-polished surface without the need for additional expensive equipment in addition to that used to determine polish defects and light point defects on the highly-polished surface.

In accordance with the present invention, a method and system for inspecting the texture of a polished surface such as a semiconductor wafer is provided that substantially eliminates or reduces disadvantages and problems associated with previously developed methods and systems for measuring surface texture and that provides an easy to use, effective, and fast way to quantify the texture of the entire wafer surface.

One aspect of the present invention, therefore, is a method for obtaining texture measurements of a highly-polished surface using a directed-energy light source. The method includes the steps of scattering the directed-energy light from a plurality of known texture surfaces. The known texture surfaces have equivalent surface area and dimensions to those of the highly-polished surface. The next step is to measure the scattered light from the directed-energy light source to establish a threshold energy level measurement above which the measured scattered light varies according to differences in texture among the plurality of known texture surfaces. The method further includes the step of establishing from variations in the measured scattered light a texture-light relationship that expresses changes in texture as dependent upon changes in measured scattered light in the plurality of known texture surfaces. The invention, moreover, includes the step of measuring the scattered light from the highly-polished surface to generate a texture measurement by applying the texture-light relationship to the measured scattered light from the highly-polished surface.

A technical advantage of the present invention is that it provides an improved method and system for testing and inspecting the polished surface of an electronic device such as a semiconductor wafer. By isolating a setting on a laser inspection system and modifying the laser inspection system to operate at a threshold level that produces outputs primarily varying only as a result of surface texture differences, the present embodiment produces effective measurements of surface texture.

Another technical advantage of the present invention is this method is that it is much less expensive to use than point measurement techniques, because of the greatly reduced time required to measure the sample, and further, because no additional handling is required for the measurement. The present invention may be employed using equipment that is used commonly for particle inspection purposes.

Another technical advantage of the present invention is that it is totally automated. This even further reduces the expense associated with using the present invention. For example, the present invention can scan the entire surface of a 150 millimeter semiconductor wafer in approximately 20 seconds. This is markedly different from the 20 minutes required for measuring on nine one-square millimeter segments using known techniques.

A further technical advantage of the present invention is that this solution scans the entire surface of the object being inspected, instead of sampling minute fractions of the surface. Because of the full wafer scan that the present invention performs, the measured results are much more accurate than those from known systems provide.

Still another technical advantage of the present invention is that it is much less sensitive to vibrations than are known methods and systems for surface texture measurements.

Yet another technical advantage of the present invention is that it is a non-destructive measurement technique. Consequently, the samples from the process can be used for further processing without further reworking.

BRIEF DESCRIPTION OF THE DRAWINGS

For a more complete understanding of the present invention and the advantages thereof, reference is now made to the following description which is to be taken in conjunction with the accompanying drawings in which like reference numerals indicate like features and wherein:

FIG. 5 plots RMS values for surface texture readings on nine one millimeter square areas on each wafer against wafer numbers to illustrate the correlation between known methods for measuring surface texture and the method of the present invention;

FIG. 6 provides a table that shows wafer identification numbers, flaw readings obtained, RMS surface texture observed readings, and RMS surface texture predicted levels for wafers examined by the process of the present invention; and FIG. 7 depicts one embodiment of the system of the present invention for obtaining texture measurements of a polished wafer surface.

DETAILED DESCRIPTION OF THE INVENTION

Preferred embodiments of the present invention are illustrated in the FIGURES like numerals being used to refer to like and corresponding parts of the various drawings.

Figure 1:
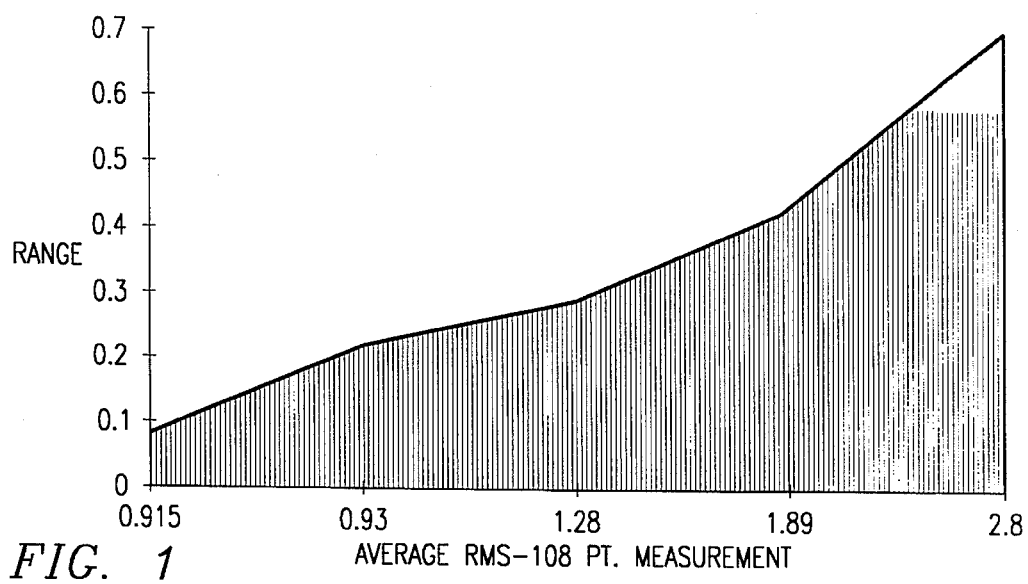
FIGS. 1 and 2 show plots of RMS data that relate to the texture of a polished wafer surface.
Figure 2:
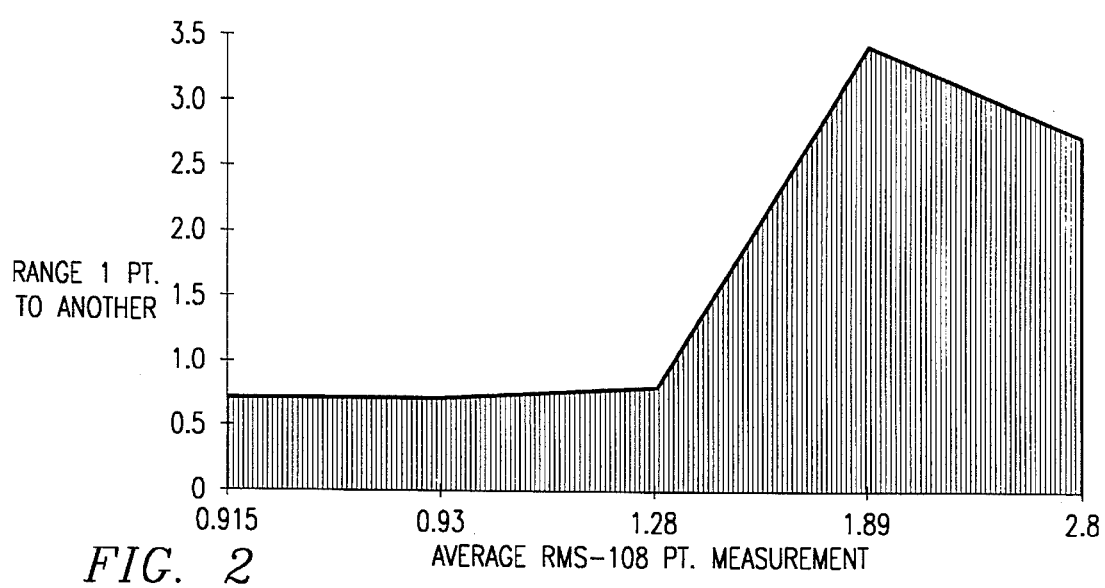
Figure 3:
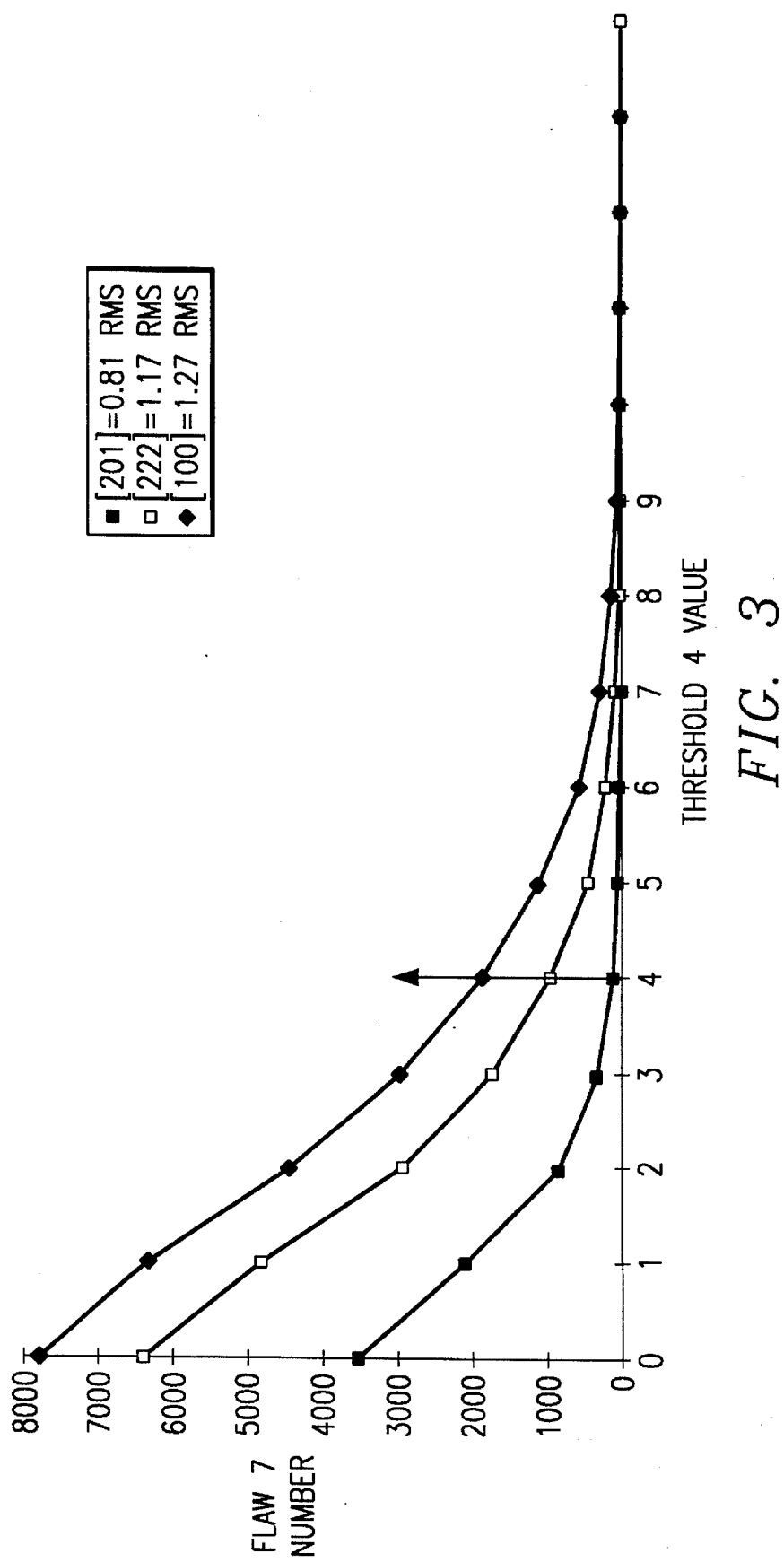
FIG. 3 shows a family of curves that plot threshold voltage levels against flaw readings from the system of the present embodiment.

An important aspect of the present embodiment is the recognition that as surface texture changes for a highly polished surface, so does the effectiveness of conventional techniques for measuring surface texture. That is, for example, as surface texture increases, the variability of surface texture measurements also increase from one point to another on the surface. This is true, for example, on a highly-polished surface such as a semiconductor wafer. FIGS. 1 through 3, below, point out this discovered phenomenon and illustrate how this can be useful to determine the surface texture of an entire semiconductor wafer of a known surface area and dimension.

FIG. 1, therefore, shows plot 10 that depicts the range (0.0–0.7 nm) for comparing nine-point group measurements against one another along axis 12, while axis 14 shows average RMS surface texture (0.915–2.8 nm) for 108 point measurements. That is, the average RMS is for all 108 points, while the range compares one nine-point group to another nine-point group. Line 16 shows that the range of RMS values increases monotically as the average RMS surface texture value increases for a sample size of 108 points. In other words, with an average RMS surface texture value of 0.915 nm RMS the range is less than 0.1 nm. As the average RMS surface texture value increases to 2.80 nm the range of RMS data increases to 0.7 nm.

FIG. 2, in addition, plots surface texture range (0.0–3.5 nm) from one point to another along axis 22 versus average RMS surface texture (0.915–2.80 nm) along axis 24. FIG. 2 shows curve 20, which between a 0.915 nm and 1.28 nm average RMS surface texture value assumes a relatively constant value until point 26. At point 26, the average RMS value for the 108-point sample increases to 1.89 nm while the range of surface textures from one point to another increases to point 28 where it has a measurement value of approximately 3.5 nm. As the average RMS surface texture value further increases to 2.8 nm RMS, the texture measurement range from one point to another decreases to point 30 where it assumes a value of approximately 2.8 nm RMS.

The method of the present embodiment makes possible both a qualitative and quantitative assessment of the surface texture of a highly-polished surface such as a semiconductor wafer surface. There are other smooth or highly-polished surface for which the present embodiment may provide meaningful results, such as a surface layer of a fabricated electronic component or a packaging material for an electronic device that requires a very smooth surface, for example.

For the measurements that the present invention makes possible, the present embodiment includes the steps of scattering the directed-energy light from a plurality of known texture surfaces. The known texture surfaces have equivalent surface area and dimensions to those of the highly-polished surface. The next step is to measure the scattered light from the directed-energy light source to establish a threshold energy level measurement above which the measured scattered light varies according to differences in texture among the plurality of known texture surfaces. The method further includes the step of establishing from variations in the measured scattered light a texture-light relationship that expresses changes in texture as dependent upon changes in measured scattered light in the plurality of known texture surfaces. The present embodiment, moreover, includes the step of measuring the scattered light from the highly-polished polished surface to generate a texture measurement by applying the texture-light relationship to the measured scattered light from the highly-polished surface.

To carry out these steps, the present embodiment employs a wafer inspection system (WIS) known as the ESTEK laser inspect system WIS-900, manufactured by ESTEK Corporation of Charlotte, N.C. Other models of the ESTEK laser wafer inspection systems such as the WIS-800 and WIS-850 may easily be used for the present invention.

The WIS-900 has a dark channel which looks at LPDs and a light channel that looks at imperfections on and in the wafers surfaces such as mounds, slurry rings, stacking faults, other epitaxial surface defects. On the ESTEK laser WIS-900 are different flaw settings numbering from Flaw1 through Flaw9, for example, and numerous threshold setting ranging from T1 through T5. The flaw settings permit the identification of certain flaws in a semiconductor wafer. The threshold settings are voltage levels that identify the noise levels above which the ESTEK WIS-900 will produce a reading. The ESTEK WIS-900 is designed to inspect for certain types of defects in and on the wafer.

In the present embodiment, it has been determined that threshold level T4 is most sensitive to wafer surface texture, and is preferred. Note, however, that the T5 level at Flaw9 is also sensitive to surface texture. The method of the present embodiment, therefore, is to create a library of wafers of a known or uniform surface area and diameter and which have known variations in surface texture. The method further is to determine the Flaw7 reading for all of this library of wafers at the T4 threshold level. From these measurements, a linear regression relationship may be established that relates Flaw7 readings to known surface texture values. There may be other types of correlation establishing functions that may be performed to relate measured Flaw7 readings using the ESTEK WIS-900 with the texture values of the wafers in the library of wafers.

Upon establishing this relationship, the next step in the process of the present embodiment is to take a Flaw7 reading of a highly polished wafer having the same dimension and surface area as those within the library of wafers. Using the relationship established from the library of wafers, it is possible to determine a predicted or estimated surface texture value from the measured Flaw7 reading of the wafer having the unknown texture. This was done for the curves that appear in FIG. 3.

FIG. 3, accordingly, plots Flaw7 numbers along axis 31 (0–8000) versus threshold values (0–9) for the ESTEK WIS-900 system along axis 33. In FIG. 3, line 40 shows the 1.27 nm RMS values for Flaw7 versus threshold values 0 through 9. Line 42 shows the measured Flaw7 versus threshold values for 1.17 nm RMS surface texture wafers. Line 44 shows the 0.81 nm RMS surface texture values of Flaw7 number versus threshold values.

As arrow 46 of FIG. 3 indicates, when threshold level T4 equals the value 4, the Flaw7 number for line 40 is at point 48 which has a value of approximately 2000. Line 42 has a T4 value at point 50 of approximately 1000. Line 44 shows a much smaller Flaw7 number at point 52 of approximately 100. The curve shows that the machine can differentiate between textures very clearly at low thresholds. Hence, a threshold point close to the noise was selected say 4. A group of wafers with different textures were run at that point and the corresponding Flaw7 numbers were obtained.

In existing measurements using the Estek WIS-900, differences in Flaw7 readings at different threshold levels were attributed to light channel noise that might have originated from electrical noise, ambient light, or mechanical vibrations. However, in the present invention, it is recognized that (1) electrical noise is a constant for a set drive voltage on the PMT; (2) ambient light is correctable by designing a light tight mechanical configuration; and (3) mechanical vibrations are correctable by vibration isolation features built into the equipment.

The present embodiment, therefore, isolates the noises attributable to those recognizable differences in these reading to surface texture of the wafer. For this purpose semiconductor wafers were polished for different lengths of time at different removal rates to give rise to surfaces that had different textures on them. These wafers were then measured on the WYCO to obtain the RMS roughness value.

For precision, the WYCO was programmed to measure 108 different points on the wafer surface. A process control computer automatically generates the texture measurement. Next a group of wafers with known difference in texture were run through the Estek WIS-900. Starting at zero, the light channel threshold setting was increased in steps of one and the corresponding Flaw7 value was noted. In order to obtain the family of lines that appear in FIG. 3, an iterative process adjusts the threshold sensing values at the T4 level to assure that the measurements that result are due to changes in surface texture for the family of curves. Also, the present embodiment recognizes that surface area and noise are directly related. An eight-inch wafer, for example, gives rise to more noise than does a six-inch wafer. Consequently, in producing a family of lines such as those of FIG. 3, the group of wafers should have the same surface areas and dimensions.

A regression analysis was done to obtain the correlation between Flaw7 numbers determined according to the present method and RMS roughness values obtained using a conventional technique. In particular, a WYCO inspection system was used to measure one-square millimeter spaces from which to compare the results of the present embodiment. The correlation equation for the 108 sample size was formulated using standard linear regression techniques to yield the following texture-scattered light:

$$RMS = 0.000284 \times \text{Flaw 7} + 0.86045 \text{ nm} \tag{1}$$

Figure 4:
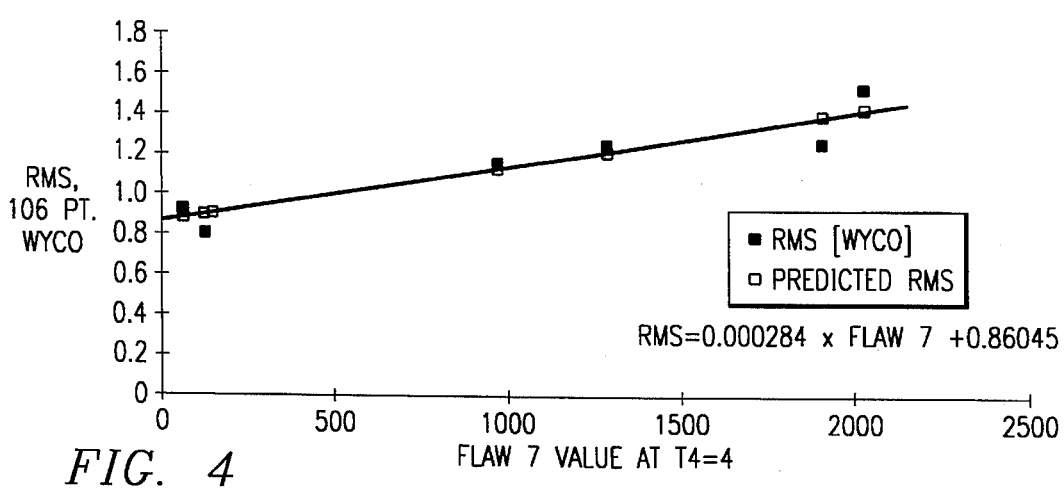
FIG. 4 plots expected texture readings with actual RMS values for observed texture readings for 108 points on a wafer at a predetermined flaw setting and threshold voltage value for the system of the present embodiment.

With this model, excellent correlations were obtained with correlation coefficients of 0.93 and 0.96 for six-inch and four-inch wafers respectively. FIG. 4 shows results obtained on 108 point measurements of a semiconductor wafer from which the correlation of the present embodiment is formed. FIG. 5 shows the graphs of the values obtained from the WYCO versus the predicted value from the Flaw7 readings for six-inch wafers to establish the validity of the estimation that the present embodiment provides. In addition, FIG. 6 includes a table that relates measured RMS values from the WYCO measurements and those predicted using the relationship established through the linear regression model.

FIG. 4, in particular, plots dark squares, as legend 54 suggests, to indicate measured RMS values and light squares to indicated predicted RMS values for the 108 point WYCO samples. RMS surface texture values (0–1.8 nm RMS) on axis 56 appear according to legend 54 as dark squares. Axis 58 indicates Flaw7 values ranging from 0 to 2500. As line 60 indicates, a monotonically increasing relationship exists between Flaw7 values at T4 and the RMS surface texture measurements. Moreover, a high correlation exists between the actually recorded RMS surface texture values and those predicted using the method of the present embodiment.

FIG. 5 plots RMS values (0.00–1.20 nm) obtained for nine areas on each wafer along axis 61 against wafer numbers (1 through 12) along axis 62. As FIG. 5 indicates, using the symbols from the legend 64, the RMS value as determined by the method of the present embodiment produces a value of 0.95 nm RMS at point 66 while the conventional method shows an RMS value of 1.14 at point 68 with a one wafer sample. With a twelve-wafer sample, point 70 shows an RMS value of 0.92. The RMS value for the method of the present embodiment is 0.86 at point 72. From these data points, it is clear that as the number of wafers increases, a stronger correlation exists between the RMS value using the present embodiment and the RMS value measured by the conventional method.

FIG. 6 provides a table of RMS values for the Flaw7 detector using the present embodiment. In FIG. 6, the scribe numbers are simply identification numbers for identifying a particular wafer. For example, the Flaw7 numbers range from 67 to 2024. These Flaw7 numbers produce RMS values ranging from 0.81 to 1.54 nm. In the FIG. 6 table, the predicted RMS values from the method of the present embodiment, generally track the increase that exists in the actually measured RMS values for the total 108 sample size. This further validates the model the present embodiment uses to relate surface texture of the semiconductor wafers to the scattered light from the wafer surface.

Another important aspect of the present embodiment is the use of an existing system, i.e., the Estek WIS900, for example, to produce the surface texture measurements. This produces numerous technical advantages. To promote an understanding of how the present method uses the WIS-900, a conceptual diagram appears in FIG. 7.

FIG. 7, therefore, shows laser inspection system 100, which is typical for the Estek WIS-900, WIS-800, and WIS-850 for carrying out the method of the present embodiment. In FIG. 7, laser inspection system 100 includes dark channel photomultiplier tube (PMT) 102 that sends a PMT signal to an analog to digital circuit (not shown). Connecting to dark channel PMT 102 is dark channel collector 104. Dark channel collector 104 receives its input from elliptical relay mirror 106. Elliptical relay mirror 106 receives the input from dark channel elliptical collector 108 that reflects from wafer 110 as light rays 112 reach wafer 110. Dark channel elliptical collector 108 includes slots 114 and 116. Slot 114 passes light from parabolic mirror 118 to wafer 110. Parabolic mirror 118 receives reflected light from folding mirror 120 that rotating mirror 122 generates. Rotating mirror 122 receives its light from laser 124 after it passes through spot forming optics 126. Light channel collector 128 receives light through opening 116 and produces an input to light channel PMT 130. From light channel PMT 130 a PMT signal goes to an associated analog-to-digital circuit (not shown).

The light channel collector 128 signal detects any flaw that causes the light intensity at collector 128 to decrease as a dip in the channel reading. Ideally, the reading should be flat for a very smooth surface without any light channel defects. Typically, this reading is flat, but is not a uniform straight line. It has some noise which manifest itself as flaws at the highest sensitivity settings of laser inspection system 100. In fact, the flaws that are detected may not appear under a microscope.

These measurements may change based on the operation of the PMT within laser inspection system 100, as well as other parameters associated with system 100. These may include, for example, the angle of collection for dark channel collector 104 and light channel collector 128, as well as the position of parabolic mirror 118, dark channel elliptical collector 108 and elliptical relay mirror 106 and folding mirror 120. Once these adjustments are made, however, they are uniform for the entire library of wafers. This produces reliable measurement and interpolation for a given wafer tested according to the correlation for the library of wafers.

OPERATION

An example that uses the results of the present embodiment may further illustrate inventive aspects in the present embodiment. Suppose that a Flaw7 value for a given wafer at the threshold 4 value is 1500. Using the family of curves that FIG. 3 shows, a value of 1500 falls between point 48 on line 40 and line 50 on line 42. The 1500 value falls, conveniently in this example, half of the distance between the approximately 2000 value of point 48 and the approximately 1000 value for point 50. By linear interpolation, a value of 1500 would relate to a surface texture value of 1.22 nm RMS. This would be the predicted value for the surface texture using the method of the present embodiment.

ALTERNATIVE EMBODIMENTS

Although the invention has been described in detail herein with reference to the illustrative embodiments, it is to be understood that this description is by way of example only and is not to be construed in a limiting sense. For example, because the Estek WIS-900 and other such systems are not designed to performed surface texture measurements, it is well within the scope of the present invention to modify these types of systems to make them more surface texture sensitive. In addition, these types of systems may be modified so that they may perform particle defect, polish defect, and surface texture inspection at a single pass.

An additional important point is that not only does the present invention have application with the ESTEK WIS-900, but other wafer inspection systems may be used to practice the present invention. For example, FIGS. 8 and 9 show data for five-inch wafers derived from the ESTEK WIS-800. Thus, plot 150 of FIG. 8 shows line 152 for the 2.6 RMS readings of wafers at T4 and Flaw7 using an ESTEK WIS-800, while line 154 shows the values for 1.8 RMS surface texture wafers, and line 156 shows the values for 0.8 RMS surface texture wafers. Likewise, FIG. 9 shows plot 160 the readings that result at Flaw9 and T5 settings for five-inch wafers on the same ESTEK WIS-800, for 2.6 RMS surface texture wafers, line 162, 1.8 RMS surface texture wafers, line 164, and 0.8 RMS surface texture wafers.

The results of FIGS. 8 and 9 illustrate that the present process has application in wafers of varying diameters and with different types of wafer inspection systems. Furthermore, different correlations may be used for different sizes and dimensions of wafers, such as for 100 mm, 125 mm, and 200 mm wafers. It is to be further understood that numerous changes in the details of the embodiments of the invention and additional embodiments of the invention, will be apparent to, and may be made by, persons of ordinary skill in the art having reference to this description. It is contemplated that all such changes and additional embodiments are within the spirit and true scope of the invention as claimed below.

What is claimed is:

1. A method for measuring the surface texture of a highly-polished surface using a directed-energy light source, comprising the steps of:

scattering directed-energy Light from the directed-energy light source from a plurality of known texture surfaces, said known texture surfaces having equivalent surface area and dimensions to those of the highly-polished surface;

measuring the scattered light from the directed-energy light source said measured scattered light to establish a threshold energy level measurement above which the measured scattered light varies according to differences in texture among said plurality of known texture surfaces;

establishing from variations in the measured scattered light based on said threshold energy level measurement a texture-light relationship that expresses expected changes in measured scattered light according to changes in texture in said plurality of known texture surfaces;

measuring scattered light from the highly-polished surface; and generating a texture measurement by applying the texture-light relationship to said measured scattered light from the highly-polished surface.

2. The method of claim 1, wherein said highly-polished surface comprises a silicon wafer and said plurality of known texture surfaces comprise a plurality of known texture silicon wafers.

3. The method of claim 1, wherein said measuring step for said plurality of known texture surfaces comprises the step of measuring the scattered light from the entire surface of each of said plurality of known texture surfaces and further wherein said measuring step for said highly-polished surface comprises the step of measuring the scattered light from the entire surface of said highly-polished surface.

4. The method of claim 1, further comprising the step of inspecting said highly-polished surface for light point defects in conjunction with measuring said surface texture of said highly-polished surface.

5. The method of claim 1, further comprising the step of inspecting said highly-polished surface for polish defects in conjunction with measuring said surface texture of said highly-polished surface.

6. The method of claim 1, wherein said measuring step for said highly-polished surface and said generating step are performed by a process control computer.

7. The method of claim 1, wherein said scattering step, said measuring step for said plurality of known texture surfaces, said establishing step, said measuring step for said highly-polished surface, and said generating step are performed by a process control computer.

8. A method for forming the semiconductor wafer, comprising the steps of:

polishing the semiconductor wafer surface;

inspecting the surface of the semiconductor wafer by measuring the semiconductor wafer surface texture, said texture measuring step comprising the steps of:

scattering a directed-energy light source from a plurality of known texture semi-conductor wafer surfaces, said known texture semi-conductor wafer surfaces having equivalent surface area and dimension to those of the highly-polished surface;

measuring the scattered light from the directed-energy light source and using said measured scattered light to establish a threshold energy level measurement above which the measured scattered light varies according to differences in texture among said plurality of known texture semi-conductor wafer surfaces;

establishing from variations in the measured scattered light based on said threshold energy level measurement a texture-light relationship that expresses expected changes in measured scattered light according to changes in texture in said plurality of known texture semi-conductor wafer surfaces;

measuring scattered light from the highly-polished surface; and generating a texture measurement by applying the texture-light relationship to said measured scattered light from the highly-polished surface.

9. The method of claim 8, wherein said measuring step for said plurality of known texture surfaces comprises the step of measuring the scattered light from the entire surface of each of said plurality of known texture semi-conductor wafer surfaces and further wherein said measuring step for said highly-polished surface comprises the step of measuring the scattered light from the entire surface of said semi-conductor wafer surface.

10. The method of claim 8, further comprising the step of inspecting said semiconductor wafer surface for light point defects in conjunction with measuring said surface texture of said highly-polished surface.

11. The method of claim 8, further comprising the step of inspecting said semiconductor wafer surface for polish defects in conjunction with measuring said surface texture of said semi-conductor wafer surface.

12. The method of claim 8, wherein said measuring step for said semiconductor wafer surface and said generating step are performed by a process control computer.

13. The method of claim 8, wherein said scattering step, said measuring step for said plurality of known texture surfaces, said establishing step, said measuring step for said highly-polished surface, and said generating step are performed by a process control computer.

14. A system for obtaining texture measurements of a highly-polished surface, comprising:

a plurality of known texture surfaces having equivalent surface area and dimension to those of the highly-polished surface;

a directed-energy light source for scattering a known amount of light onto said plurality of known texture surfaces;

light measuring circuitry for measuring the scattered light from the directed-energy light source and using measured scattered light to establish a threshold energy level measurement above which the measured scattered light varies according to differences in surface texture among said plurality of known texture surfaces;

calculating circuitry for establishing from variations in the measured scattered light based on threshold energy level measurement a texture-light relationship that expresses expected changes in measured scattered light according to changes in texture in said plurality of known texture surfaces;

said light measuring circuitry further for measuring scattered light from the highly-polished surface; and said calculating circuitry further for generating a texture measurement by applying said texture-light relationship to said measured scattered light from the highly-polished surface.

15. The system of claim 14, wherein said highly-polished surface comprises a silicon wafer and said plurality of known texture surfaces comprise a plurality of known texture silicon wafers.

16. The system of claim 14, wherein said measuring circuitry comprises circuitry measuring the scattered light from the entire surface of each of said plurality of known texture surfaces and further wherein said measuring circuitry comprises the step of measuring the scattered light from the entire surface of said highly-polished surface.

17. The system of claim 14, further comprising light point defect inspection circuitry inspection circuitry inspecting said highly-polished surface for light point defects in conjunction with measuring said surface texture of said highly-polished surface.

18. The system of claim 14, further comprising inspecting circuitry for inspecting said highly-polished surface for polish defects in conjunction with measuring said surface texture of said highly-polished surface.

19. The system of claim 14, further comprising a process control computer for controlling said scattering circuitry, said measuring circuitry and said calculating circuitry for automatically generating said texture measurement.

20. The system of claim 14, wherein said threshold energy level measurement includes energy levels attributable from electric noise, ambient light, and mechanical vibrations so that the measure scattered light varied sue to variation in surface texture.

* * * * *